United States Patent [19]
Kazimir et al.

[11] 3,953,573
[45] Apr. 27, 1976

[54] REMOVAL OF BORON FROM MgCl$_2$ BRINES

[75] Inventors: Edward O. Kazimir, Pennington; Donald J. Weintritt, Robbinsville, both of N.J.

[73] Assignee: N L Industries, Inc., New York, N.Y.

[22] Filed: Feb. 21, 1975

[21] Appl. No.: 551,749

[52] U.S. Cl. ............................. 423/161; 423/158; 423/178; 423/184; 423/497; 423/499; 71/128; 23/293 R
[51] Int. Cl.$^2$ ..................... C01F 5/30; C01D 3/06
[58] Field of Search ........... 423/497, 499, 184, 158, 423/161, 178; 23/293 R

[56] References Cited
UNITED STATES PATENTS

| | | | |
|---|---|---|---|
| 436,663 | 9/1890 | Monsanto | 423/499 X |
| 2,402,959 | 7/1946 | Gustafson et al. | 423/497 X |
| 2,906,599 | 9/1959 | Roland | 423/184 |

*Primary Examiner*—Edward Stern

[57] ABSTRACT

Minute amounts of boron present in naturally occurring brines found in oceans, inland seas, salt lakes and the like are removed by treating the brine with a solid, finely divided lignite.

6 Claims, No Drawings

3,953,573

REMOVAL OF BORON FROM MgCl₂ BRINES

BACKGROUND OF INVENTION

Molten substantially anhydrous magnesium chloride is a widely used electrolyte for the production of electrolytic magnesium metal; and is commonly derived from brine concentrates comprising essentially magnesium chloride a typical process for producing these brine concentrates from naturally occurring brines being disclosed in U.S. Pat. No. 3516785 and included by reference. In brief, these brine concentrates are produced by subjecting naturally occurring brines to solar evaporation in a series of stages to form what is commonly referred to as a holding pond brine; and thereafter concentrating the holding pond brine in one or more stages to produce a brine concentrate consisting essentially of magnesium chloride, water and trace amounts of other metals and/or metal oxides including boron. This brine concentrate is then dehydrated, preferably by spray drying, and the substantially dry product melted to form a molten electrolyte.

Now it is well known that when a magnesium chloride electrolyte prepared from a brine concentrate and containing boron or a boron compound in proportions equivalent to as little as from 150 to 200 ppm boron is electrolyzed the magnesium metal does not coalesce readily but tends to form as discrete globules dispersed in the cell melt with the result that cell current efficiencies are lowered and significant amounts of magnesium metal end up in the cell smut.

It is important therefore to production of magnesium metal on plant scale that the magnesium chloride electrolyte be substantially free of boron or that the level of boron in the electrolyte be reduced sufficiently that its adverse effects on the coalescence of the magnesium metal and cell efficiencies be minimized.

Known methods for producing magnesium chloride electrolytes having low levels of boron include chlorination of the spray dried magnesium chloride concentrate either during melting of the spray dried material or subsequent thereto. However, removal of boron by chlorination is a slow and expensive process requiring long contact times in the melt cells and/or chlorinators, and the handling of large volumes of gaseous chlorine. As a result melt cell life is seriously shortened and catastrophic feeding and corrosion problems develop.

It is also known to reduce the level of boron in magnesium chloride electrolytes by extracting the boron from a magnesium chloride brine prior to forming the anhydrous cell feed material using liquid-liquid extraction techniques as described, for example, in Pats. Nos. Br, 1354944, U.S. 3493349, and U.S. 3433604 wherein extraction of the boron is effected by means of an organic extractant. However, these and other known processes for reducing the level of boron in magnesium chloride brines are prohibitively expensive on a commercial plant scale due to large losses of costly organic additives; or the elaborate and expensive regeneration techniques required to reclaim these additives.

It is desirably therefore, in the interest of the efficient electrolytic production of magnesium metal from salt brines on a commercial scale to provide a relatively simple, inexpensive method and means for forming substantially boron-free magnesium chloride electrolytes from naturally occurring brines consistent with the overall economy of the process.

SUMMARY OF INVENTION

In its broadest aspects then, the present invention is the discovery of a simple and relatively inexpensive method for treating naturally occurring brines and in particular brines derived from Great Salt Lake, Utah so that the boron level in the brine is reduced sufficiently, prior to concentration and spray drying, that the necessity for chlorinating the spray dried material to remove boron is eliminated or at least minimized sufficiently to obviate the high costs and catastrophic problems attending present chlorination methods. More particularly it has now been found that these objectives can be achieved by reducing the level of boron in holding pond brines to at least as low as 100 ppm and preferably less than 50 ppm, efficiently and economically by solid-liquid extraction using a solid extractant comprising a particulate lignite and in particular a commercial grade known as Geopon LG-20 manufactured and sold by N L Industries, Inc. This is a naturally weathered North Dakota lignite which comprises about 60% humic acid, less than 10% ash, about 16% water and trace amounts of other ingredients; the principal ingredients of the ash being calcium, silica and aluminum plus lesser amounts of magnesium and iron. While these weathered lignites have been found to be satisfactory extractants for the removal of boron from salt brines even better results have been achieved using other forms of finely divided lignite and in particular neutralized lignites i.e. naturally occurring lignites which have been treated with alkali or alkaline earth metal such as sodium, potassium, calcium or magnesium to neutralize or partially neutralize the humic acid of the lignite An ammonium-lignite is also contemplated within the scope of the present invention as are synthetic weathered lignite prepared by treatment of polysaccrides such as cornstarch, potato starch, molasses and sugar with caustic soda. For purposes of brevity the aforesaid naturally occurring lignites, the neutralized or partially neutralized lignites and synthetic weathered lignites are hereinafter referred to, generically as lignite.

PREFERRED EMBODIMENT

Pursuant to the method of this invention a holding pond brine having a specific gravity of about 1.3 and analyzing about: 6.0 to 8.5% Mg as MgCl₂, from 0.42 to 0.61% Na, from 0.54 to 0.83% K, from 0.05 to 0.06% Li, from 0.005 to 0.007% Ca, from 3.58 to 4.18% SO₄ and from 450 to 550 ppm B is intimately contacted with particulate lignite which is dried and ground to a screen size in range from −40 to +325 standard screen; and an amount in a range of from 1 to 30% on a brine weight basis at ambient temperature for a predetermined period of time, e.g. 1-3 hours, after which the solid extractant is separated from the brine in any suitable manner as for example by filtration, centrifuging or simply maintaining the slurry in a quiescent state such that the solid extractant settles leaving a supernatant brine from which an appreciable portion of the boron has been removed by absorption in the extractant. If the level of boron in the supernatant brines is still too high following the first treatment then the supernatant brine may be treated again in substantially the same manner as hereinabove described to remove any residual boron the treatment process being capable of repetition until the boron level in the brine is reduced to at least as low as 100 parts per million and preferably less than 50 ppm boron.

The amount of extractant added to the brine will depend on the compositions of the brine which, in turn, will vary depending upon where the brine is treated in the successive evaporation and concentration steps leading to the formation of a brine concentrate. In a plant scale operation the extractant would be added prior to the desulfating step; or it may be added at any point thereafter prior to spray drying the concentrated brine, greater amounts of extractant being required with increasing concentrations.

Further, it is well known that naturally oxidized lignite (leonardite) is a rich source of humus, and in this capacity is a valuable additive to soil for improving its texture and tilth; and that boron is used as trace element in fertilizers for fertilizing fruit trees and the like. An additional advantage then, arising out of the newly discovered use of lignite as an extractant for boron from salt brines is the recovery, by filtration or equivalent means, of a solid boronrich lignite. This product has been assayed as comprising from 0.05 to 0.2% boron and as such is an ideal commercial product for the agricultural industry.

The following examples will further illustrate the novel features of the instant invention.

EXAMPLE I

To 181 gms. brine analyzing about 7.2% $MgCl_2$ and 500 ppm boron, was added 40 gms. finely ground calcium treated lignite having a screen size of about +120 mesh. The pH value of the slurry was about 4.0. The slurry was thoroughly mixed without heating for about 180 minutes and then filtered. An analyses of the recovered filtrate showed only 200 ppm boron the latter figure being indicative of about 43% removal of the boron. The extractant separated from the fltrate consisted essentially of lignite plus about .1% boron.

EXAMPLE II 100 gms. of a finely ground calcium treated lignite having a screen size of about 200 mesh was placed in a 250cc column in which the lignite formed a porous bed substantially 18 inches high. 175 mls. of a pond brine analyzing about 7.2% $MgCl_2$ and 500 ppm boron, were then fed to the bed and five successive cuts were taken from the column of 85, 99, 105, 143 and 174 gms. brine, respectively. The brine from each cut had a pH of about 2 and analyzed for parts per million boron with the following results: 66, 57, 43, 13 and 12, respectively, the latter being indicative of about 97% removal of boron from the brine. The lignite extractant recovered from the column comprised about 0.2% boron.

EXAMPLE III

Another Experiment was run similar to Example 2 except the lignite was given a carbonic acid wash to partially neutralize the humic acid. Five successive cuts were take from the column at 89, 114, 125, 148 and 174.5 gms brine, respectively. Each brine cut had a pH of about 6 and when analyzed each cut registered less than 2 ppm boron.

Another run was made similar to the runs of Example II except that the bed of lignite was treated with HCl. The removal of boron from the brine was negligible showing that an acid pH adversely affects boron removal.

The present invention thus provides a simple and economical method for lowering the boron values in salt brines to a level sufficiently low such that when subsequently concentrated the magnesium chloride brine concentrate will contain no more than about 100 and less than 50 parts per million boron to as little as about 2 parts per million boron the process being characterized by the use of an inorganic extractant comprising a relatively inexpensive finely divided lignite. Further the by-product lignite extractant recovered from the brine has been found to contain boron in amounts sufficient to enhance the effectiveness of the lignite as a commercial product useful to agriculture.

While the invention has been described and illustrated by the examples included herein it is not intended that the invention be strictly limited thereto and other variations and modifications may be employed within the scope of the appended claims.

We claim:
1. Method for removing boron from naturally occurring magnesium chloride brines by solid-liquid extraction comprising: mixing said brine with a solid extractant comprising lignite in particle size range from −40 to +325 mesh at ambient temperature and at a pH in range from about 2 to about 6 for a period of time such that the boron in said brine is absorbed by said extractant and then separating the essentially boron-free brine from said extractant.

2. Method for removing boron from naturally occurring brines according to Claim 1 wherein said brine comprises essentially from 6.0 to 8.5% $MgCl_2$ and from 450 to 550 ppm boron, and the amount of lignite added to said brine is in the range from 1 to 30% on a brine weight basis.

3. Method for removing boron from naturally occurring brines according to Claim 1 wherein the lignite contains humic acid, said lignite being partially neutralized by treating the lignite with calcium.

4. Method for removing boron from naturally occurring brines according to Claim 2 wherein the brine and solid extractant are mixed at substantially ambient temperature for a period of from 1 to 3 hours.

5. Method for removing boron from naturally occurring brines according to Claim 4 wherein the essentially boron-free brine is separated from the extractant as a filtrate.

6. Method for removing boron from naturally occurring brines according to Claim 1 wherein the lignite contains humic acid, said lignite being partially neutralized by giving the lignite a wash with carbonic acid prior to mixing said brine and said lignite.

* * * * *